US012257657B2

(12) United States Patent
Muxlow et al.

(10) Patent No.: US 12,257,657 B2
(45) Date of Patent: Mar. 25, 2025

(54) MECHANICAL VARIABLE GAP CRIMP TOOL

(71) Applicant: Magna Exteriors Inc., Aurora (CA)

(72) Inventors: Fred H. Muxlow, Barrie (CA); Cory Collins, Newmarket (CA)

(73) Assignee: Magna Exteriors Inc., Aurora (CA)

( * ) Notice: Subject to any disclaimer, the term of this patent is extended or adjusted under 35 U.S.C. 154(b) by 0 days.

(21) Appl. No.: 18/392,505

(22) Filed: Dec. 21, 2023

(65) Prior Publication Data

US 2024/0131642 A1 Apr. 25, 2024

Related U.S. Application Data

(62) Division of application No. 17/268,886, filed as application No. PCT/IB2019/056986 on Aug. 19, 2019, now Pat. No. 11,890,708.

(Continued)

(51) Int. Cl.
*B23P 19/00* (2006.01)
*B23P 19/04* (2006.01)
(Continued)

(52) U.S. Cl.
CPC ........ *B23P 19/047* (2013.01); *B25B 27/0092* (2013.01); *B25B 27/02* (2013.01); *B60J 10/45* (2016.02); *B23P 2700/50* (2013.01)

(58) Field of Classification Search
CPC ... B23P 19/047; B25B 27/0092; B25B 27/02; B60J 10/45
See application file for complete search history.

(56) References Cited

U.S. PATENT DOCUMENTS 3,680,346 A 8/1972 Wilcox
3,889,618 A 6/1975 Jarvis et al.
(Continued)

FOREIGN PATENT DOCUMENTS

DE 102005018459 A1 10/2006
EP 0818276 A 1/1998
(Continued)

OTHER PUBLICATIONS

International Search Report for PCT/IB2019/056986 dated Jan. 7, 2020, 2 pages.
(Continued)

*Primary Examiner* — Lee D Wilson
(74) *Attorney, Agent, or Firm* — Warn Partners, P.C.

(57) ABSTRACT

A tool head assembly for crimping, the assembly including an internal cam that spins freely on a stationary shaft in one direction and locks onto the shaft in the other direction. That cam rotates against the moving slide forcing to move away from the stationary shaft opening a gap between rollers. A controller is programmed to have the drive rotate in one direction for a set time period, then reverse the rotation to begin the crimp process. The start rotation of the drive rotates the cam and opens the roller gap. The forward rotation allows the cam to swing, closing the gap and rotating the rollers around a seal. The tool eliminates the air cylinder and related pneumatic hoses and valve making the head smaller and allows a controller to communicate with any OEM production system to verify the tool has been used and was used correctly.

2 Claims, 5 Drawing Sheets

Related U.S. Application Data

(60) Provisional application No. 62/765,049, filed on Aug. 17, 2018.

(51) Int. Cl.
   *B25B 27/00* (2006.01)
   *B25B 27/02* (2006.01)
   *B60J 10/00* (2016.01)

(56) References Cited

U.S. PATENT DOCUMENTS

| | | | |
|---|---|---|---|
| 5,875,670 A * | 3/1999 | Stojkovski | B60J 10/45 29/243.58 |
| 6,397,831 B1 | 6/2002 | Plunger et al. | |
| 7,134,306 B2 | 11/2006 | Muxlow et al. | |
| 7,748,094 B2 * | 7/2010 | Yamamoto | B60J 10/45 269/21 |
| 8,615,861 B2 * | 12/2013 | Muxlow | B60J 10/45 29/243.58 |
| 11,097,328 B2 | 8/2021 | Chung et al. | |
| 11,890,708 B2 * | 2/2024 | Muxlow | B23P 19/047 |
| 2004/0177667 A1 | 9/2004 | Rosenau et al. | |
| 2014/0157560 A1 | 6/2014 | Muxlow et al. | |
| 2024/0131642 A1 * | 4/2024 | Muxlow | B25B 27/0092 |

FOREIGN PATENT DOCUMENTS

| | | |
|---|---|---|
| EP | 0822019 A1 | 2/1998 |
| EP | 1440831 A2 | 7/2004 |
| EP | 2628620 A1 | 8/2013 |
| GB | 2299289 A | 10/1996 |

OTHER PUBLICATIONS

European Search Report for EP19850565 dated Aug. 13, 2021, 2-pages.

* cited by examiner

MECHANICAL VARIABLE GAP CRIMP TOOL

CROSS-REFERENCE TO RELATED APPLICATIONS

This application is a divisional of U.S. patent application Ser. No. 17/268,886, filed Feb. 16, 2021, which is a National Stage of PCT International Application No. PCT/IB2019/056986, filed Aug. 19, 2019, which claims the benefit of U.S. Provisional Application No. 62/765,049 filed Aug. 17, 2018. The disclosures of the above application are incorporated herein by reference.

FIELD OF THE INVENTION

The present invention relates to mechanical variable gap crimp on flange tool.

BACKGROUND OF THE INVENTION

Crimp tools are known in automotive and used to put a seal or weatherstripping on a structure such as flanges of liftgates, trunks and doors. An operator orients the tool against the seal in position relative to the flange. The tool is activated and the operator manually moves the tool to follow the path of the flange to mount the seal to the flange.

Current tooling requires the rollers of the crimp tool to move or start in an open gap position. Once activated the rollers are required to close to a set gap to crimp/squeeze the seal onto a vehicle flange. This is done by means of a pneumatic system utilizing a pneumatic cylinder. A pneumatic system cannot reliably give feedback to verify the tool has been used for the correct amount of time. Current DC or battery tools have this capability and are used in plants currently. To use this drive, however, eliminates the ability to open and close the rollers as there is no longer a pneumatic power source to do this. To not open the rollers causes damage to the seal during the crimp process. While crimping tools have used commercially available battery drives, they have not had the ability to open and close the roller gap. These tools rely on a set gap size and the tool is rolled onto a seal under power causing damage to the seal in that area. Further, a spring loaded head mounted on a drive would need the ability to open/close for proper processing without damage, however, until the present invention, such parameters could not be met because it was not strong enough to do with electric (e.g., not powerful enough servos to open/close).

Accordingly, there exists a need for an electric drive tool that retained the functionality of a pneumatic tool while adding no size or weight to the head. Furthermore, for cabatability with current functions that provide a feed back showing the tool has been used and for the correct amount of time and any other predetermined process/operator parameters.

SUMMARY OF THE INVENTION

There is provided a tool head assembly to crimp a seal or weatherstrip, in particular, to crimp to a flange in any automotive application (e.g., lift gate, side doors, trunk, etc) or any other application requiring crimping. The tool head assembly is operably mountable on any tooling drive mechanism/system under any source of power (e.g., servo on robotic arm, DC drive, programmable DC drive, battery cordless drive, programmable battery cordless drive, etc). Thus, the source of power is interchangeable without departure from the scope of the present invention. The present invention generally incorporates a mechanical cam in the tool head. The tool head is utilyzed to put a seal, weatherstripping or any other part on on a structure such as flanges of liftgates, trunks, doors and any other vehicle structure.

The tool head includes at least one of each of the following: drive shaft, cam, oneway locking bearing, and a movable slide. The developed head utilized the ability to program the drive to a specific process. The head was designed to have an internal cam that would spin freely on the drive shaft in one direction and lock onto the shaft in the other direction. That cam would rotate against the moving slide forcing it to move away from the drive shaft opening the gap between rollers. A controller is programmed to have the drive rotate in one direction for a set time period when the trigger was pulled then reverse the rotation to begin the crimp process. The start rotation of the drive rotated the cam and opens the roller gap. The forward rotation would allow the cam to swing, closing the gap and rotating the rollers around the seal. This design now allows the tool to function the same as the pneumatic style tool, eliminates the air cylinder and related pneumatic hoses and valve making the head smaller and allows a controller to communicate with any OEM production system to verify the tool has been used and was used for the correct amount of time.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
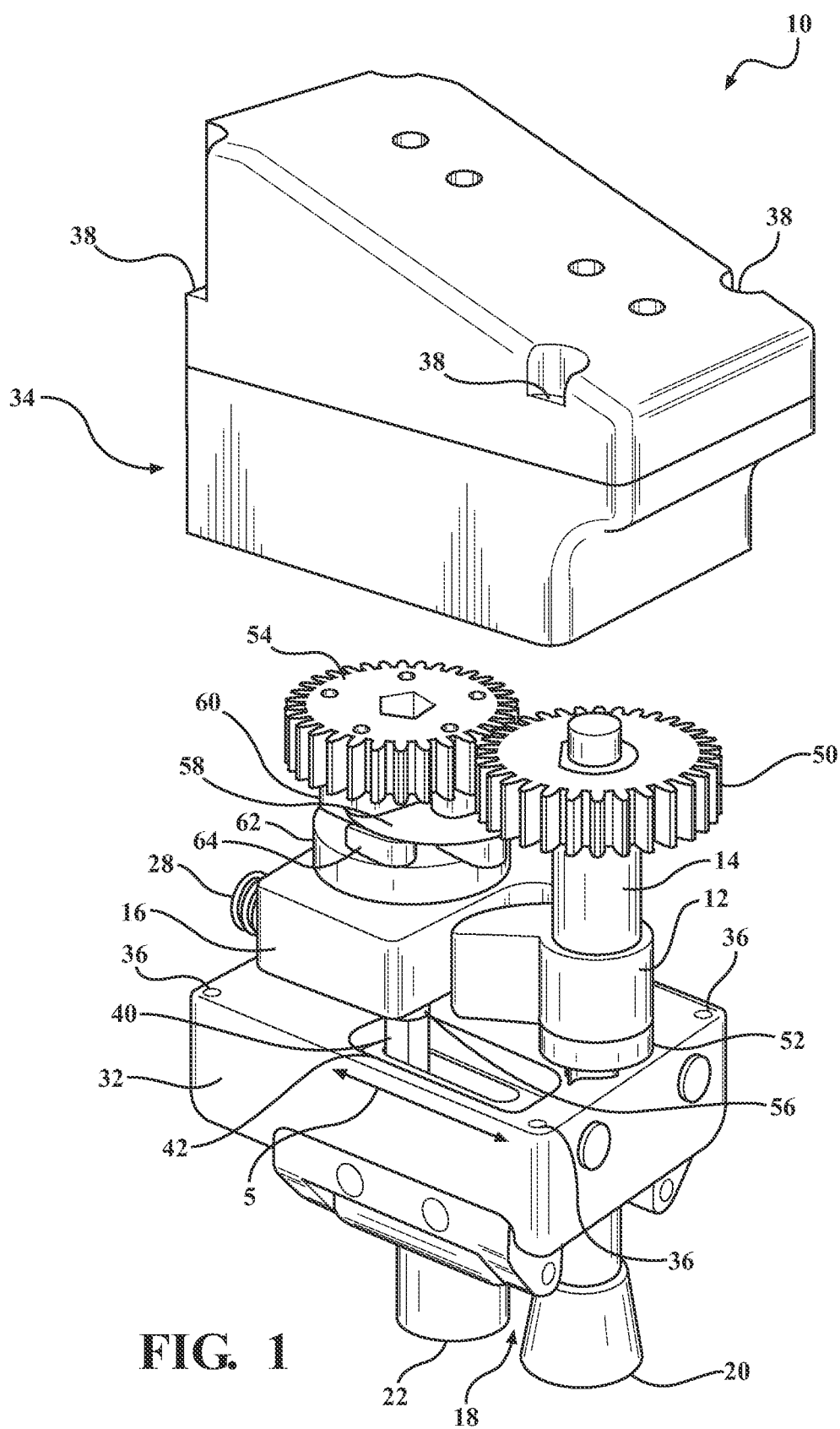
FIG. 1, is an exploded perspective view of the tool head assembly, in accordance with the present invention.
Figure 2A:
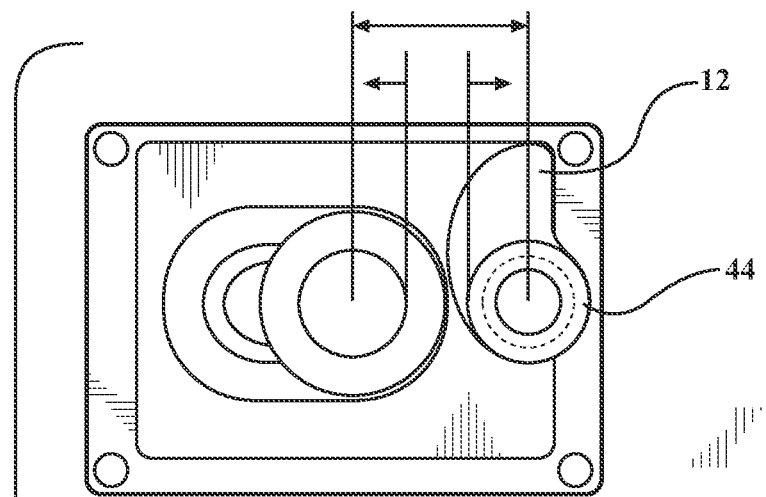
FIG. 2a is a top plan sectional view of the tool head assembly depicting a gap change closed/gap change opened, in accordance with the present invention.
Figure 2A:
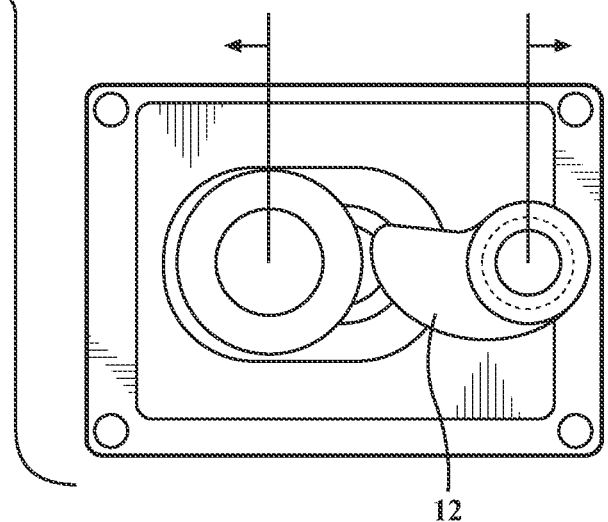
Figure 2B:
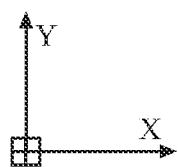
FIG. 2b is a top plan view of a movable slide and a cam of the tool head assembly, in accordance with the present invention.
Figure 2B:
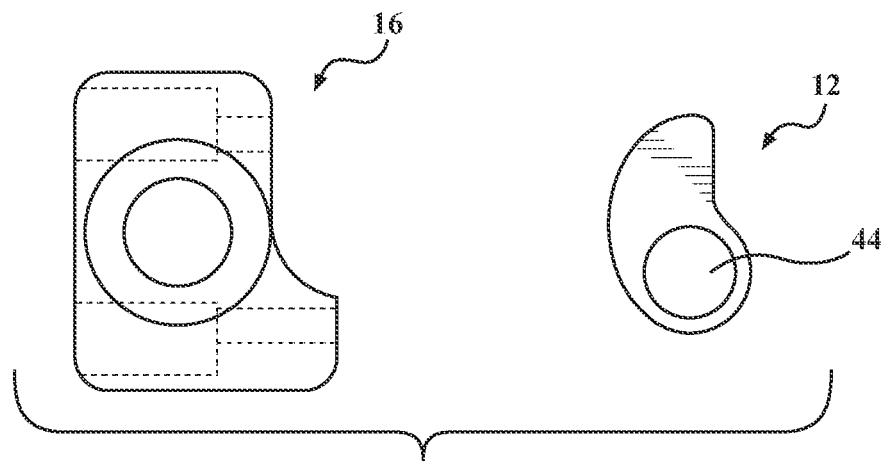
Figure 3:
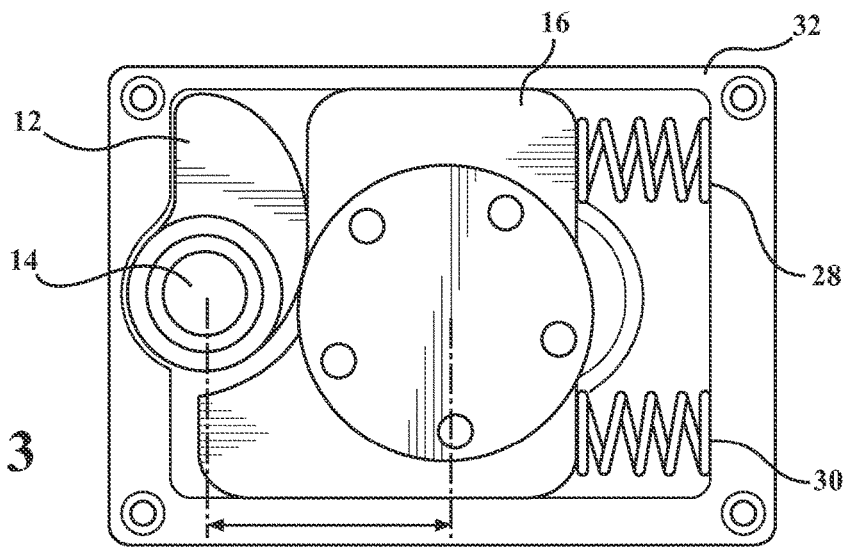
FIG. 3 is a top plan sectional view of the cam biased to a closed position; in accordance with the present invention.
Figure 4:
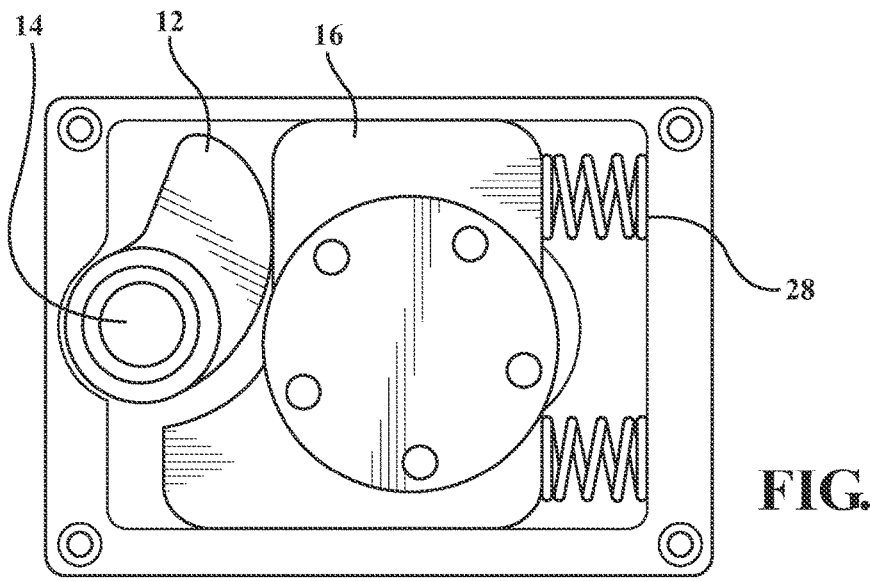
FIG. 4 is a top perspective view of the cam rotating in a first direction pushing the movable slide longitudinally in an opening direction; in accordance with the present invention.
Figure 5:
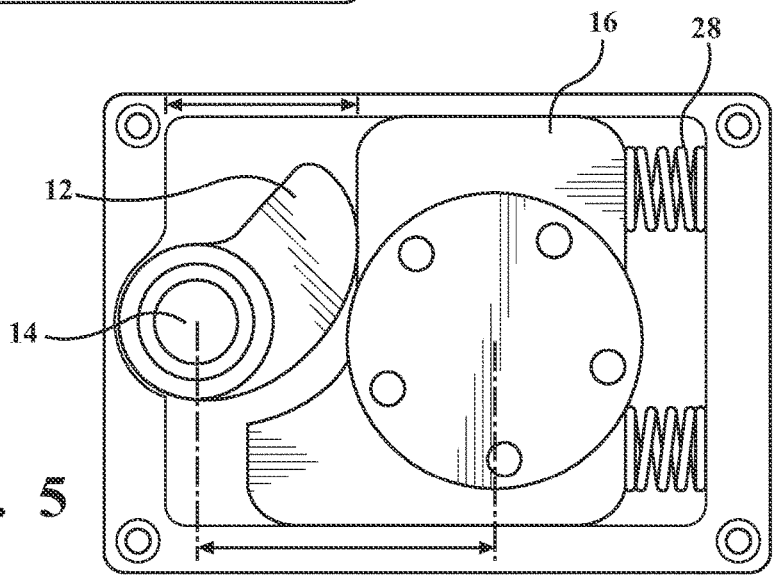
FIG. 5 is a top plan view of the cam rotated further in the first direction and the movable slide in an exemplary open position; in accordance with the present invention.
Figure 6:
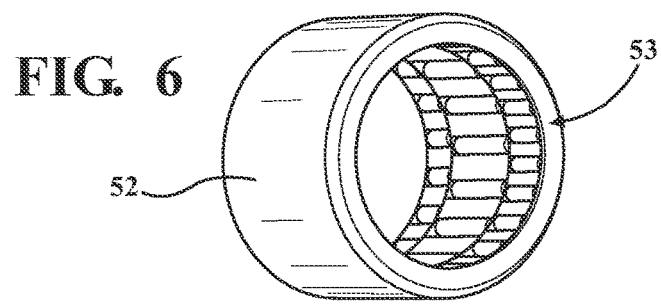
FIG. 6 is a perspective view of an exemplary lockable bearing; in accordance with the present invention.

The following description of the preferred embodiment(s) is merely exemplary in nature and is in no way intended to limit the invention, its application, or uses.

Referring to FIGS. 1-10 generally, there is provided a tool head assembly, shown generally at 10, in accordance with the present invention. The tool head assembly 10 includes at least one cam 12, drive shaft 14 or "stationary shaft", movable slide 16, and a oneway locking bearing. The head assembly 10 has the internal cam 12, which spins freely on the drive shaft 14 in one direction and locks onto the shaft 14 in the other direction. That cam 12 rotates against the movable slide 16 forcing it to move away from the drive shaft 14 opening a gap, shown generally at 18, between rollers, e.g., a first and second roller 20,22 or "post".

Figure 7:
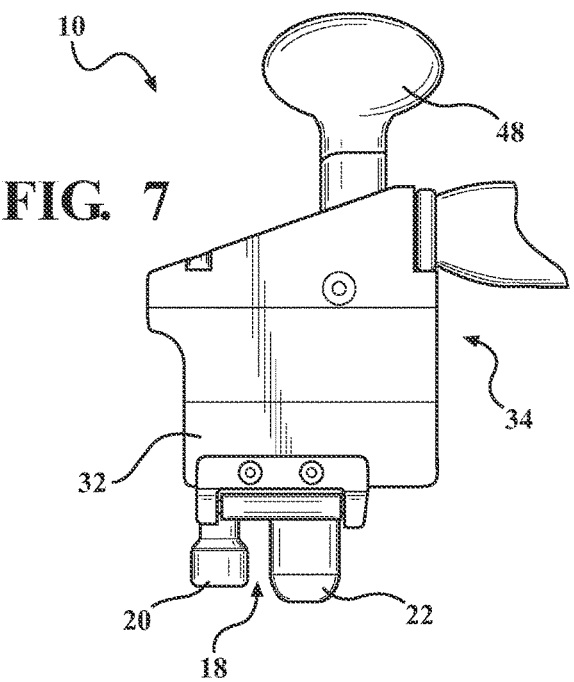
FIG. 7 is a perspective view of the tool head assembly with rollers in a gap closed position, in accordance with the present invention.
Figure 8:
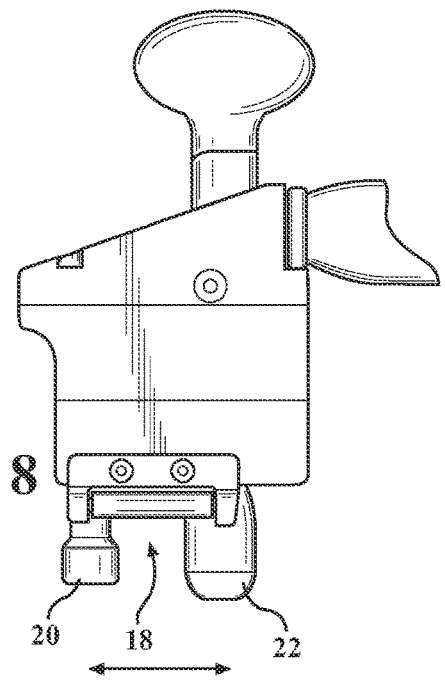
FIG. 8 is a perspective view of the tool head assembly with rollers in a gap opened position; in accordance with the present invention.
Figure 9:
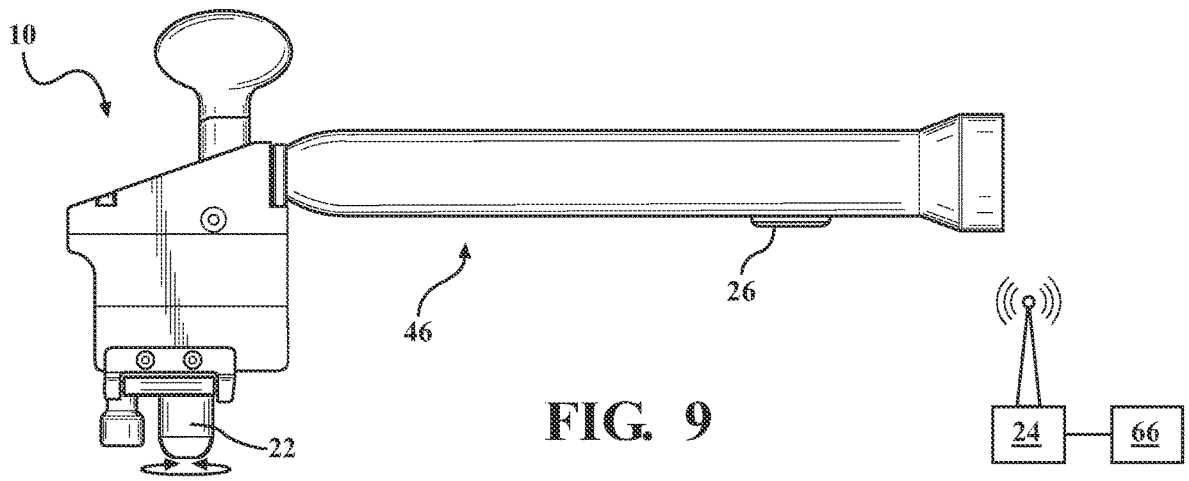
FIG. 9 is a perspective view of the tool head assembly operably mounted to an illustrative drive/power source as an example of an environment use, in accordance with the present invention; and, FIG. 10 is a perspective view of the tool head assembly depicting a crimping head putting an exemplary seal onto a vehicle flange.
Figure 10:
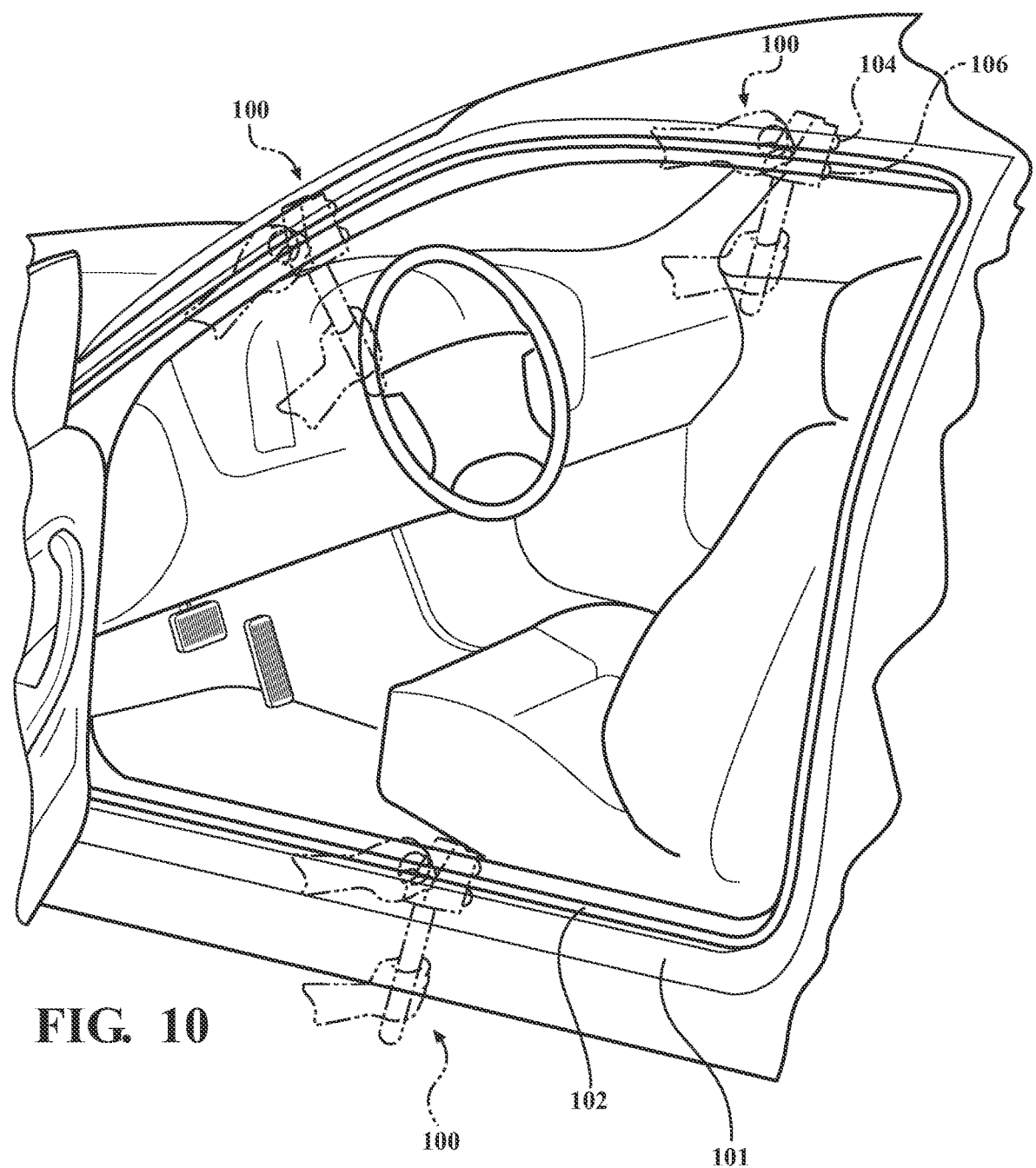

It is understood that the drive shaft 14 is preferably a rotating shaft, however, the shaft 14 is stationary in that the shaft 14 does not move in a lateral direction. The drive shaft 14 keeps the position of the first roller 20, including, as the second roller 22 selectively translates away from or toward the first roller 20 to change the gap 18. As the second roller 22 moves toward and away from the first roller 20, which is stationary, the gap 18 between the rollers 20,22 decreases and increases (closes/opens), respectively. FIGS. 7 and 9 generally depict an exemplary narrowed gap 18 compared to the more open position of exemplary FIG. 8.

Preferably, the developed tool head assembly 10 utilizes the ability to program a predetermined drive to a specific process depending on the application.

A controller 24 (see FIG. 9) is programmable to have the drive rotate in one direction for a predetermined set time period (e.g., generally about 5-60 seconds, typically 5-30 seconds, preferably 2-20 seconds, most preferably 2-10 seconds) when a trigger 26 or "button" is actuated (e.g., pulled, compressed, pushed, slid, rotated, etc) then reverse the rotation to begin the crimp process. The controller 24 utilizes wireless or hardwired protocols, preferably, wireless. Preferably, the controller 24 operably incorporates with at least one sensor, electric sensor, gyroscope, accelaramator, and/or camera, etc.

The start rotation of the drive rotates the cam 12 and opens the roller gap 18. The forward rotation then allows the cam 12 to swing, closing the gap 18 and allowing translating the rollers 20,22 around the seal (e.g., seal or weatherstrip of a lift gate, car trunk, front side doors, rear side doors, windshield, flange or any other predetermined part, any predetermined cover part to secure the cover part to any predetermined structural member). This design allows the head tool assembly 10 to function similarly as a pneumatic style tool, but eliminates the air cylinder and related pneumatic hoses and valve making the tool head assembly 10 smaller. Preferably, at least the second roller 22 spins while applying the seal, as indicated in FIG. 9. Most preferably, the second roller 22 spins and the first roller 20 does not spin while applying the seal.

Preferably, the system allows the controller 24 to communicate with any production feedback device 66 or system 66 (e.g., any OEM production system) to verify and operably communicate feedback to a database, any other predetermined operable data compiler, and/or tool operator in real time that the tool is/has been used and is/has been used properly according to predetermined parameters, e.g., used in the correct predetermined orientation(s), angle(s) and/or position feedback, used for the correct predetermined amount of time, used at correct predetermined speed, used at correct predetermined pressure or force, etc.

At least one biasing member 28, preferably two biasing members 28,30 (most preferably, spring(s)), biases the movable slide 16 against the cam 12 in the closed direction to urge the first and second rollers 20,22 together. Most preferably, to urge the second roller 22 toward the first roller 20 and the first roller 20 is laterally stationary.

The drive shaft 14 preferably extends through an aperture formed in a block 32 and is operably coupled to the first post 20. The block 32 is operably coupled to a housing shown generally at 34. Preferably, a plurality of fasteners connect the block 32 to the housing 34 via a plurality of apertures 36,38.

The second post 22 is operably coupled to the movable slide 16 to move in the direction of the moveable slide 16 (in a closed direction or biased direction toward the drive shaft 14 and in an open direction away from the drive shaft 14). Preferably, the second post 22 is operably connected to a second shaft 40 extending through an aperture 42 (e.g., elongated aperture) formed in the block 32. The second shaft 40 or "slide shaft" or "moveable shaft" is operably connected to the moveable slide 16.

The drive shaft 14 preferably extends through a locking bearing 44 or "cam bearing". The locking bearing 44 is a one way locking bearing that spins free in one direction, and locks on drive shaft 14 in the other direction.

The tool head assembly 10 is operably arranged to allow movement of the second shaft 40 towards/away from the drive shaft 14 during operation of the tool head assembly 10 to accommodate variations in structural member/flange thicknesses.

The drive shaft 14 is rotatable about a first axis of rotation. Preferably, a predetermined tooling drive mechanism is operably coupled to the drive shaft 14, and the first roller 20 is operably fixedly connected to the drive shaft 14 toward an end of the shaft outside the housing 34, such that the drive shaft 14 and first roller 20 rotate together, or operably coupled to the second roller 22 and shaft such that the shaft and second roller 22 rotate together. A first gear 50 or "drive gear" is operably mounted on the drive shaft 14. The cam 12, first gear 50 and first roller 20 rotate with the drive shaft 14. The drive shaft 14 is stationary in that the shaft 14 does not slide in the block 32. Preferably, at least one support bearing 52 including bearing surfaces 53 is operably mounted along the drive shaft 14 at a predetermined location. Alternatively, the first roller 20 does not rotate.

The second roller 22 is operably connected to the slideable shaft 40 toward an end of the shaft outside the housing 34, such that the slideable shaft 40 and second roller 22 rotate together. A second gear 54, e.g., driven gear, is operably mounted on the slideable shaft 40 and in meshing engagement with the first gear 50. Rotation of the first gear 50 in one direction rotates the second gear 54 in an opposite direction. The slideable shaft 40 rotates about a second axis of rotation and is also slideable along the aperture 42 as indicated by arrow "5". Preferably, at least one support bearing 56 is operably mounted along the shaft 40.

An intermediate rotary member 58 is operably coupled, e.g., rotatably coupled, to the second gear 54 by at least one member 60 to allow the intermediate rotary member 58 to rotate about an axis, preferably, about an axis that is offset from the first and second axes of rotation of the shafts 14,40. An output rotary member 62 is operably coupled, e.g., rotatably coupled, to the intermediate rotary member 58 by at least one second member 64 to allow the output rotary member 62 to rotate about one of the axes of rotation. The arrangement provides for torque transfer from the drive shaft 14 to the slidable shaft 40, and thereby from the cam 12 to the moveable slide 16.

The tool head assembly 10 is operably connected to a handle shown generally at 46 of a crimping assembly or any other predetermined assembly. Preferably, at least one guiding member 48 is provided to assist the operator in moving the assembly 10 along the desired path during crimp processing. The tool head assembly 10 applies a force against the part (e.g., seal strip) to position the part relative to the the structural member (e.g., part over the flange). The partially closed gap rollers (e.g., exemplarily depicted in FIGS. 9-10) apply a generally inward force to crimp the part against the side(s) of the structural member.

The tool head assembly 10 is arranged with the rollers 20,22 axis of rotations generally parallel with the longitudinal axis of the handle 46. Alternatively, tool head assembly 10 is arranged with the rollers 20,22 axis of rotations generally about 90 degrees with respect to the longitudinal axis of the handle 46. Alternatively, the tool head assembly 10 is any predetermined angle with respect to the handle 46, generally about 0-180 degrees, typically about 0 to 125 degrees, preferably about 0 to 45 degrees, most preferably about 0 to 90 degrees. It is understood that the tool head assembly 10 rollers 20,22 are positioned with respect to the handle 46 in any predetermined orientation or angle depending on the application without departure from the scope of the present invention.

The rollers 20,22 can be metal or any predetermined durable material suitable to prevent damage to the part and provide crimping.

According to an aspect of the present invention, an operator engages a trigger 26 to open/widen the gap. The cam rotates in a first direction to push the block and open the gap, then when the tool is in place to the molding/flange, releases the trigger narrowing the gap and moving the assembly 10 along the predetermined path during crimp processing.

According to an aspect of the present invention, there is provided a method for mechanical variable gap crimping including providing the tool head assembly 10 described previously. Determining predetermined parameters, e.g., orientation(s), angle(s) and/or position feedback, crimping time, total crimping time, crimping time by predetermined area(s)/portion(s) being applied to the vehicle (e.g., curved regions, corners, generally straight paths, etc), correct speed, variable speeds, speeds based on location, pressure or force, etc. Optionally, programing predetermined parameters into a controller 24. Setting/inputting predetermined parameters into a controller 24 (e.g., to have the drive rotate in one direction for a predetermined set time period, such as, generally about 5-60 seconds, typically 5-30 seconds, preferably 2-20 seconds, most preferably 2-10 seconds). Providing a feedback device 66. Applying the predetermined part (e.g., weather strip) to the vehicle using the assembly 10 (e.g., vehicle flange). Compiling data that the assembly 10 is being and/or was used and used properly (e.g., according to the predetermined parameters). Communicating that the assembly 10 is being and/or was used and used properly (e.g., according to the predetermined parameters). Storing said data. Preferably, the method includes a processing capability to run reports, etc for manufacturers (OEM, weatherstrip manufacturer) for quality assurance, recall purposes, etc.

Conventional liftgate decklid tools crimp a liftgate decklid strip to a flange using crimping posts. Current tooling requires the rollers of the crimp tool to move or start in an open gap position. Once activated the rollers are required to close to a set gap to crimp/squeeze the seal onto a vehicle flange. This is done by means of a pneumatic system utilizing a pneumatic cylinder. A pneumatic system cannot reliably give feedback to verify the tool has been used for the correct amount of time. Current DC or battery tools have this capability and are used in plants currently. To use this drive, however, eliminates the ability to open and close the rollers as there is no longer a pneumatic power source to do this. To not open the rollers causes damage to the seal during the crimp process. While crimping tools have used commercially available battery drives, they have not had the ability to open and close the roller gap. These tools rely on a set gap size and the tool is rolled onto a seal under power causing damage to the seal in that area. Further, a spring loaded head mounted on a drive would need the ability to open/close for proper processing without damage, however, until the present invention, such parameters could not be met because it was not strong enough to do with electric (e.g., not powerful enough servos to open/close).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for mechanical variable gap crimping, including:
    a step of providing a variable gap crimp on flange tool assembly including rollers;
    a step of determining predetermined parameters for application of a weather strip to a vehicle flange;
    a step of providing a controller with the predetermined parameters;
    a step of providing at least one feedback device;
    a step of orienting said rollers of said variable gap crimp on flange tool assembly to said weather strip and vehicle flange;
    a step of applying said weather strip to said vehicle flange without the use of an air cylinder;
    a step of compiling data on predetermined parameters; and
    a step of communicating data to an user, when desired.

2. The method of claim 1, wherein in the step of providing a controller with the predetermined parameters, the predetermined parameters are selected from the group consisting of tool head assembly orientation(s), angle(s), position(s), duration of tool head assembly use per vehicle or part, speed, pressure, force, variables depending on part location on the vehicle and combinations thereof.

* * * * *